United States Patent [19]
Allen

[11] 3,897,261
[45] July 29, 1975

[54] HYDROUS OXIDE COATED $TiO_2$

[75] Inventor: Alvin Allen, Wilmington, Del.

[73] Assignee: E. I. du Pont de Nemours & Co., Wilmington, Del.

[22] Filed: Dec. 20, 1973

[21] Appl. No.: 426,474

[52] U.S. Cl. .............................. 106/300; 106/308 B
[51] Int. Cl. ........................... C09c 1/36; C09c 3/00
[58] Field of Search ................. 106/300, 308 B, 309

[56] References Cited
UNITED STATES PATENTS

| | | | |
|---|---|---|---|
| 3,203,818 | 8/1965 | Rechmann et al. | 106/300 |
| 3,251,705 | 5/1966 | Rieck et al. | 106/300 |
| 3,515,566 | 6/1970 | Moody et al. | 106/300 |
| 3,529,985 | 9/1970 | Jester et al. | 106/300 |

Primary Examiner—Winston A. Douglas
Assistant Examiner—J. V. Howard

[57] ABSTRACT

A $TiO_2$ base pigment is treated successively in slurry form at nearly neutral pH conditions with 1 to 4% silica, 4 to 9% alumina, 1 to 4% silica and 4 to 9% alumina. The resultant product is outstanding in hiding power without substantial sacrifice to other properties such as film integrity.

4 Claims, No Drawings

HYDROUS OXIDE COATED TIO$_2$

BACKGROUND OF THE INVENTION

The treatment of pigmentary titanium dioxide, TiO$_2$, in the rutile or anatase form with hydrous oxides, especially silica and alumina, is known in the art to provide pigments exhibiting good hiding power in flat paints. The pigment manufacturing process of Angerman U.S. Pat. No. 3,591,398 was an important advance in that it made possible the attainment of paint films having good hiding power without a substantial sacrifice in other properties such as film integrity.

The present invention is directed to a further improvement over the process of U.S. Pat. No. 3,591,398 whereby there is obtained a hydrous oxide coated pigment having outstanding properties with respect to hiding power.

SUMMARY OF THE INVENTION

In accordance with the invention there is provided a process for treatment pigmentary TiO$_2$ comprising the steps a. gradually adding to an aqueous slurry of the TiO$_2$ an alkaline solution of a soluble silicate in an amount to provide from about 1 to 4% silica, as SiO$_2$ and based on the weight of the TiO$_2$, the pH of the slurry being maintained below about 9 during silicate addition by introduction of acid thereby to precipitate the silica, the amount of acid being insufficient to lower the pH below about 5, b. gradually adding to the resultant slurry an alkaline solution of a soluble aluminum salt in an amount to provide from about 4 to 9% alumina, as Al$_2$O$_3$ and based on the weight of the TiO$_2$, the pH being maintained in the range of about 5 to 9 during aluminum salt addition by introduction of acid thereby to precipitate the alumina, c. gradually adding to the resultant slurry an alkaline solution of a soluble silicate in an amount to provide from about 1 to 4% silica, as SiO$_2$ and based on the weight of the TiO$_2$, the pH being maintained in the range of about 5 to 9 during silicate addition by introduction of acid thereby to precipitate the silica, and d. gradually adding to the resultant slurry an alkaline solution of a soluble aluminum salt in an amount to provide from about 4 to 9% alumina, as Al$_2$O$_3$ and based on the weight of the TiO$_2$, the pH being maintained in the range of about 5 to 9 during aluminum salt addition by introduction of acid thereby to precipitate the alumina.

The use of a succession of silica and alumina treatments in accordance with the foregoing is found to result in a TiO$_2$ pigment exhibiting outstanding hiding power when incorporated in flat paints. This is particularly evident when a comparison is made versus pigments prepared in a generally similar fashion but using only a single silica treatment and a single alumina treatment. Moreover the improvement in hiding power is achieved without substantial sacrifice to the stain resistance and scrub resistance properties of the paint films, i.e., properties which are considered to reflect the so-called film integrity paint films.

DETAILS OF THE INVENTION

The base titanium dioxide pigment may be prepared by the high temperature vapor phase oxidation of TiCl$_4$, the vapor phase hydrolysis of TiCl$_4$, or the hydrolysis of colloidally seeded sulfuric acid solutions of titaniferous raw materials such as ilmenite. Rutile TiO$_2$ is preferred. The hydrolysate of the sulfuric acid process must be washed and calcined to develop the crystalline characteristic and particle size needed for the good light scattering characteristics of pigments. The temperature of the slurry being treated may vary from 20°C. to 90°C., but it is preferred that the temperature be from 50°C. to 70°C. The slurry should be agitated throughout the precipitation of both the silica and the alumina to insure general uniformity of the pH conditions within the specified ranges. In general the initial slurry should be prepared to have a solids content of about 100 to 900 g/l.

The treatments of the base TiO$_2$ pigment with soluble silicate solutions and soluble aluminum salt solutions in accordance with the invention should take place for the most part under nearly neutral conditions, i.e., in the pH range of about 5 to 9, and preferably about 6 to 8. Indeed the best results are attained when the pH is essentially 7 throughout the treatment. When the initial slurry of base TiO$_2$ is quite acid, as usually will be the case with TiO$_2$ produced by the vapor phase oxidation of TiCl$_4$, the first quantity of the soluble silicate solution added thereto will suffice to raise the pH to the desired level. Thereafter it will be necessary to add, either simultaneously or intermittently, portions of an acid to maintain the pH in the range of 5 to 9. Any acid may be used but mineral acids such as HCl, H$_2$SO$_4$, HNO$_3$ and H$_3$PO$_4$ are preferred.

The addition of acid, soluble silicate solutions and soluble aluminum salt solutions to the slurry should be effected gradually while agitating the slurry. Preferably a high speed mechanical mixer is used to insure uniform pH conditions. A brief curing period may be provided between successive silica and alumina treatments or after the final alumina treatment but this is not essential.

While it is possible to effect the treatments when the slurry temperature is anywhere from about 20°C. to 90°C. and the pH is anywhere from about 5 to 9, operation at the higher pH values is most successful when a lower temperature is used, and vice-versa. Operation at about 60°C. and near pH 7 represents a preferred optimum.

Any soluble silica which is alkaline in aqueous medium may be used in the process including sodium or potassium silicate. Commercially available water soluble sodium silicates with SiO$_2$/Na$_2$O weight ratios from about 1.6 to about 3.5 and varying from 32% to 54% by weight of solids, with or without further dilution, are the most practical.

Any soluble aluminum salt which is alkaline in aqueous medium may be used in the process including sodium or potassium aluminate. Such aluminate solutions are conventionally prepared to contain excess caustic to facilitate solubility.

Each silica treatment is carried out to precipitate about 1 to 4% silica, preferably about 2 to 3% silica. Each alumina treatment is carried out to precipitate about 4 to 9% alumina, preferably about 5 to 8%. While a combined total of four such treatments is preferred, there is no objection to additional treatments where desired. In any event, the total silica precipitated should be about 2 to 8% and the total alumina precipitated should be about 8 to 18%.

This process may be applied to pigments which have been previously treated with oxides such as titania, but their presence is not essential to the benefits herein obtained. After treatment according to this process, the pigment is recovered by known procedures including neutralization of the slurry if necessary, filtration, washing, drying and frequently a dry grinding step such as micronizing. Drying is not necessary, however, as a thick slurry of the product can be used directly in preparing emulsion paints where water is the liquid phase. The process provides a method for obtaining good hiding power and good film integrity in titanium dioxide pigments.

The test procedure for hiding power (H.P.) employed herein is as follows: A film of prepared vinyl acrylic emulsion paint is drawn on a Morest Chart Form 09, a glossy paper chart having black and white areas, using a draw-down blade with an 0.0025 inch clearance. When the film is dried, the reflectances over the white and black backgrounds are measured using a Gardner Automatic Multipurpose Reflectometer. From these readings the contrast ratio is determined:

$$\text{Contrast ratio} = \frac{\text{reflectance over black}}{\text{reflectance over white}}$$

similarly, the contrast ratio is determined on a standard pigment. The relative hiding power of the samples is calculated as:

$$\text{H.P.} = \frac{\text{contrast ratio of sample}}{\text{contrast ratio of standard}} \times 100$$

EXAMPLES

The following examples will further illustrate the practice of the invention. Therein and elsewhere in this specification percentages of silica and alumina are expressed as weight percentages calculated as $SiO_2$ and $Al_2O_3$, respectively, and based on the weight of the base or uncoated pigmentary $TiO_2$. The silica and alumina are, of course, in the form of hydrous oxides.

EXAMPLE I

This example illustrates the surface treatment of a $TiO_2$ pigment successively with precipitates of 2.5% $SiO_2$, 6.5% $Al_2O_3$, 2.5% $SiO_2$ and 6.5% $Al_2O_3$.

$TiCl_4$ containing about 1% aluminum chloride is oxidized with oxygen in the vapor phase using the tubular foraminous wall reactor as disclosed in Kruse U.S. Pat. No. 3,203,763 to produce a rutile product. The base $TiO_2$ product stream leaving the reactor is quenched with chlorine, cooled in water-cooled flues and collected.

A portion of the base $TiO_2$ product is mixed with water at 60°C. to form a slurry having a pH of 3.5 and a solids content of 400 g $TiO_2$/l. Throughout the entire treatment the slurry is maintained at 60°C. while being agitated. An aqueous solution of sodium silicate having a concentration equivalent to 400 g/l $SiO_2$ and a weight ratio of $SiO_2/Na_2O$ of 3.25 is gradually added to the slurry until the pH rises to 7. At this point the addition of the silicate solution is continued while also adding concentrated $H_2SO_4$ dropwise to maintain the pH at 7. The total amount of silicate solution added in this manner is sufficient to provide 2.5% $SiO_2$. Thereafter, the addition of a sodium aluminate solution is commenced, again while dropwise adding $H_2SO_4$ to maintain a pH of 7. The sodium aluminate solution contains the equivalent of 340 g/l of $Al_2O_3$ and a 25 weight percent excess of NaOH over the composition $NaAlO_2$. The amount of sodium aluminate solution so added is sufficient to provide 6.5% $Al_2O_3$.

After allowing the slurry to stand and cure for a period of 30 minutes, further treatments with 2.5% $SiO_2$ and 6.5% $Al_2O_3$ are effected in the slurry as before while maintaining the pH at 7.

After the second alumina treatment the pigment slurry is allowed to stand and cure for another 30 minutes and it is then filtered, washed, dried at about 100°C. and micronized.

The hiding power of the pigment is 128 versus the value of 100 for a standard pigment produced by a first treatment with 6% $SiO_2$ and then with 6% $Al_2O_3$. Significantly the marked improvement in hiding power is achieved with virtually no loss in other important properties.

EXAMPLE II

The procedure of Example I is followed except that the curing periods are omitted after both alumina treatments. The results are essentially the same as in Example I as the pigment has a hiding power of 116.

EXAMPLE III

The procedure of Example I is followed except that the quantities of sodium silicate solution and sodium aluminate solution are adjusted to precipitate successively 2.5% $SiO_2$, 7% $Al_2O_3$, 2.5% $SiO_2$ and 7% $Al_2O_3$. The results are essentially the same as in Example I as the pigment has a hiding power of 114.

EXAMPLE IV

The procedure of Example I is followed except that the quantities of sodium silicate solution and sodium aluminate solution are adjusted to precipitate successively 1.5% $SiO_2$, 6.5% $Al_2O_3$, 1.5% $SiO_2$ and 6.5% $Al_2O_3$. The results are essentially the same as in Example I as the pigment has a hiding power of 109.

I claim:
1. Process for treating pigmentary $TiO_2$ comprising
   a. gradually adding to an aqueous slurry of said $TiO_2$ an alkaline solution of a soluble silicate in an amount to provide from about 1 to 4% silica, as $SiO_2$ and based on the weight of said $TiO_2$, the pH of said slurry being maintained below about 9 during silicate addition by introduction of acid thereby to precipitate the silica, the amount of said acid being insufficient to lower the pH below about 5,
   b. gradually adding to the resultant slurry an alkaline solution of a soluble aluminum salt in an amount to provide from about 4 to 9% alumina, as $Al_2O_3$ and based on the weight of said $TiO_2$, the pH being maintained in the range of about 5 to 9 during aluminum salt addition by introduction of acid thereby to precipitate the alumina,
   c. gradually adding to the resultant slurry an alkaline solution of a soluble silicate in an amount to provide from about 1 to 4% silica, as $SiO_2$ and based on the weight of said $TiO_2$, the pH being maintained in the range of about 5 to 9 during silicate addition by introduction of acid thereby to precipitate the silica, and d. gradually adding to the resultant slurry an alkaline solution of a soluble aluminum salt in an amount to provide from about 4 to 9% alumina, as $Al_2O_3$ and based on the weight of said $TiO_2$, the pH being maintained in the range of about 5 to 9 during aluminum salt addition by introduction of acid thereby to precipitate the alumina.

2. Process according to claim 1 wherein the amount of silica precipitated in each of (a) and (c) is about 2 to 3% and the amount of alumina precipitated in each of (b) and (d) is about 5 to 8%.

3. Process according to claim 1 wherein the amount of silica precipitated in each of a (a) and (c) is about 2.5% and the amount of alumina precipitated in each of (b) and (d) is about 7%.

4. Process according to claim 1 wherein the maximum pH in each of (a), (b), (c) and (d) is 8.

* * * * *